(12) United States Patent
Kitano et al.

(10) Patent No.: US 11,112,803 B2
(45) Date of Patent: Sep. 7, 2021

(54) MOBILE ROBOT AND CONTROL METHOD

(71) Applicant: THK CO., LTD., Tokyo (JP)

(72) Inventors: Hitoshi Kitano, Tokyo (JP); Takashi Naito, Tokyo (JP)

(73) Assignee: THK CO., LTD., Tokyo (JP)

( * ) Notice: Subject to any disclaimer, the term of this patent is extended or adjusted under 35 U.S.C. 154(b) by 299 days.

(21) Appl. No.: 16/317,992

(22) PCT Filed: Jul. 20, 2017

(86) PCT No.: PCT/JP2017/026274
§ 371 (c)(1),
(2) Date: Jan. 15, 2019

(87) PCT Pub. No.: WO2018/016584
PCT Pub. Date: Jan. 25, 2018

(65) Prior Publication Data
US 2021/0089045 A1    Mar. 25, 2021

(30) Foreign Application Priority Data
Jul. 21, 2016    (JP) .............................. JP2016-143228

(51) Int. Cl.
*G05D 1/00*    (2006.01)
*G05D 1/02*    (2020.01)
(Continued)

(52) U.S. Cl.
CPC ......... *G05D 1/0234* (2013.01); *G05D 1/0088* (2013.01); *G05D 1/0223* (2013.01); *G05D 2201/0203* (2013.01)

(58) Field of Classification Search
CPC .. G05D 1/0234; G05D 1/0088; G05D 1/0223; G05D 2201/0203; B62D 1/00;
(Continued)

(56) References Cited

U.S. PATENT DOCUMENTS 5,347,456 A    9/1994 Zhang et al.
5,710,565 A *  1/1998 Shirai ................ B60K 31/0008
                                                   342/70

(Continued)

FOREIGN PATENT DOCUMENTS

CN         1637432 A    7/2005
CN       101952087 A    1/2011
(Continued)

OTHER PUBLICATIONS

Office Action dated May 19, 2020, issued in counterpart Japanese Appliction No. 2016-143228, with English ranslation (6 pages).
(Continued)

*Primary Examiner* — Yonel Beaulieu
(74) *Attorney, Agent, or Firm* — Westerman, Hattori, Daniels & Adrian, LLP

(57) ABSTRACT

A mobile robot includes a driving unit which changes a moving velocity and a traveling direction, a detection unit which detects a plurality of detection objects disposed along a traveling path to a target point, and a control unit which acquires a distance and a direction to the detection object detected by the detection unit, calculates a traveling direction in which the distance to the detection object and the direction of the detection object satisfy a predetermined relationship, and controls the driving unit based on the calculated traveling direction.

11 Claims, 10 Drawing Sheets

(51) Int. Cl.
*B60W 60/00* (2020.01)
*B60W 30/14* (2006.01)
*B60W 30/16* (2020.01)
*G08G 1/16* (2006.01)

(58) Field of Classification Search
CPC ........ B62D 1/02; B62D 1/021; B62D 1/0289; B62D 1/28; B62D 15/00; B62D 15/02; B62D 6/00; B60W 30/00; B60W 30/14; B60W 30/16; B60W 30/162; B60W 30/181; B60K 31/00; B60K 31/0008; B60K 31/0016; B60K 31/0025; B60K 31/0041; B60K 31/0066; B60K 31/0075; G08G 1/16

See application file for complete search history.

(56) References Cited

U.S. PATENT DOCUMENTS

| | | | |
|---|---|---|---|
| 6,772,062 | B2 | 8/2004 | Lasky et al. |
| 9,566,911 | B2* | 2/2017 | Greenwood .............. G06T 7/20 |
| 9,971,943 | B2* | 5/2018 | Greenwood ....... G06K 9/00791 |
| 10,514,706 | B2* | 12/2019 | Schuh ................. G05D 1/0257 |
| 10,520,581 | B2* | 12/2019 | Schuh ...................... B60W 30/16 |
| 2008/0040040 | A1* | 2/2008 | Goto ...................... G05D 1/024 |
| | | | 701/301 |
| 2011/0121068 | A1 | 5/2011 | Emanuel et al. |
| 2019/0132709 | A1* | 5/2019 | Graefe ................... H04W 4/38 |
| 2019/0279049 | A1* | 9/2019 | Doria .................. G06K 9/6276 |

FOREIGN PATENT DOCUMENTS

| | | |
|---|---|---|
| CN | 104298234 A | 1/2015 |
| CN | 104412191 A | 3/2015 |
| CN | 104768821 A | 7/2015 |
| CN | 104802161 A | 7/2015 |
| CN | 111164533 A | 5/2020 |
| CN | 111417911 A | 7/2020 |
| CN | 112654945 A | 4/2021 |
| DE | 112010005318 T5 | 12/2012 |
| JP | 2002-73170 A | 3/2002 |
| JP | 2005-18248 A | 1/2005 |
| JP | 2005018248 A | 1/2005 |
| JP | 2006-4204 A | 1/2006 |
| JP | 2006004204 A | 1/2006 |
| JP | 2014-125201 A | 7/2014 |
| JP | 2014125201 A | 7/2014 |
| KR | 20030080436 A | 10/2003 |

OTHER PUBLICATIONS

Office Action dated Nov. 3, 2020, issued in counterpart TW Application No. 106124562, with the partial translation. (4 pages).
Office Action dated Aug. 25, 2020, issued in counterpart Japanese Application No. 2016-143228, with English translation. (5 pages).
International Search Report dated Oct. 10, 2017, issued in counterpart International Application No. PCT/JP2017/026274, w/English translation (2 pages).
Office Action dated May 27, 2021, issued in counterpart CN Application No. 201780044165.0, with translation of part of the Search report. (9 pages).
Office Action dated Jun. 25, 2021, issued in counterpart DE Application No. 112017003648.8, with English translation. (10 pages).

* cited by examiner

FIG. 4

| BEACON ID | PASSAGE DISTANCE | INSTALLATION SIDE | DIRECTION CHANGE | LAST BEACON |
|---|---|---|---|---|
| 1 | $D_1$ | LEFT | 0 DEGREES | NO |
| 2 | $D_2$ | LEFT | 0 DEGREES | NO |
| ... | ... | ... | ... | ... |
| m | $D_m$ | LEFT | 90 DEGREES | NO |
| ... | ... | ... | ... | ... |
| M | $D_M$ | LEFT | 0 DEGREES | YES |

MOBILE ROBOT AND CONTROL METHOD

TECHNICAL FIELD

The present invention relates to a mobile robot and a control method.

This application claims priority on Japanese Patent Application No. 2016-143228, filed Jul. 21, 2016, the content of which is incorporated herein by reference.

BACKGROUND ART

A transmitter such as a beacon is used to guide a mobile robot that moves autonomously. For example, a cleaning robot as a mobile robot performs an operation motion of moving to a charger and receiving supply of power from the charger based on signals generated from a beacon provided in the charger. Also, a mobile working robot described in Patent Literature 1 detects a reference position and controls movement based on signals generated from a beacon.

In such control of movement using a beacon of a mobile robot that moves autonomously; control of moving toward a target beacon and stopping movement when approaching or touching the beacon is generally performed. In the case where a mobile robot performing such control is guided to a destination using a plurality of beacons, the mobile robot repeats control in which when the mobile robot moves toward a target beacon and has approached to a predetermined distance, the mobile robot moves toward the next target beacon. In this case, there may be some wasted movement before the mobile robot reaches the destination when the mobile robot approaches too close to the target beacon or the like.

CITATION LIST

Patent Literature

Patent Literature 1

Japanese Unexamined Patent Application, First Publication No. 2002-073170

SUMMARY OF INVENTION

Technical Problem

The present invention provides a mobile robot and a control method by which a traveling distance when moving based on a plurality of transmitters can be reduced.

Solution to Problem

An aspect of the present invention is a mobile robot including a driving unit which changes a moving velocity and a traveling direction, a detection unit which detects a plurality of detection objects disposed along a traveling path to a target point, and a control unit which acquires a distance and a direction to a detection object detected by the detection unit, calculates the traveling direction in which the distance to the detection object and the direction of the detection object satisfy a predetermined relationship, and controls the driving unit based on the calculated traveling direction.

Also, an aspect of the present invention is a control method for a mobile robot including a driving unit which changes a moving velocity and a traveling direction and a detection unit which detects a plurality of detection objects disposed along a traveling path to a target point, the method having a first step of acquiring a distance and a direction to a detection object detected by the detection unit, a second step of calculating the traveling direction in which the distance to the detection object and the direction of the detection object satisfy a predetermined relationship, and a third step of controlling the driving unit based on the calculated traveling direction.

Advantageous Effects of Invention

According to the aspects described above, it is possible to reduce the traveling distance when moving based on a plurality of beacons.

BRIEF DESCRIPTION OF DRAWINGS

FIG. 4 is a diagram showing an example of a table stored in a traveling path storage unit according to the first embodiment.

DESCRIPTION OF EMBODIMENTS

Figure 1:
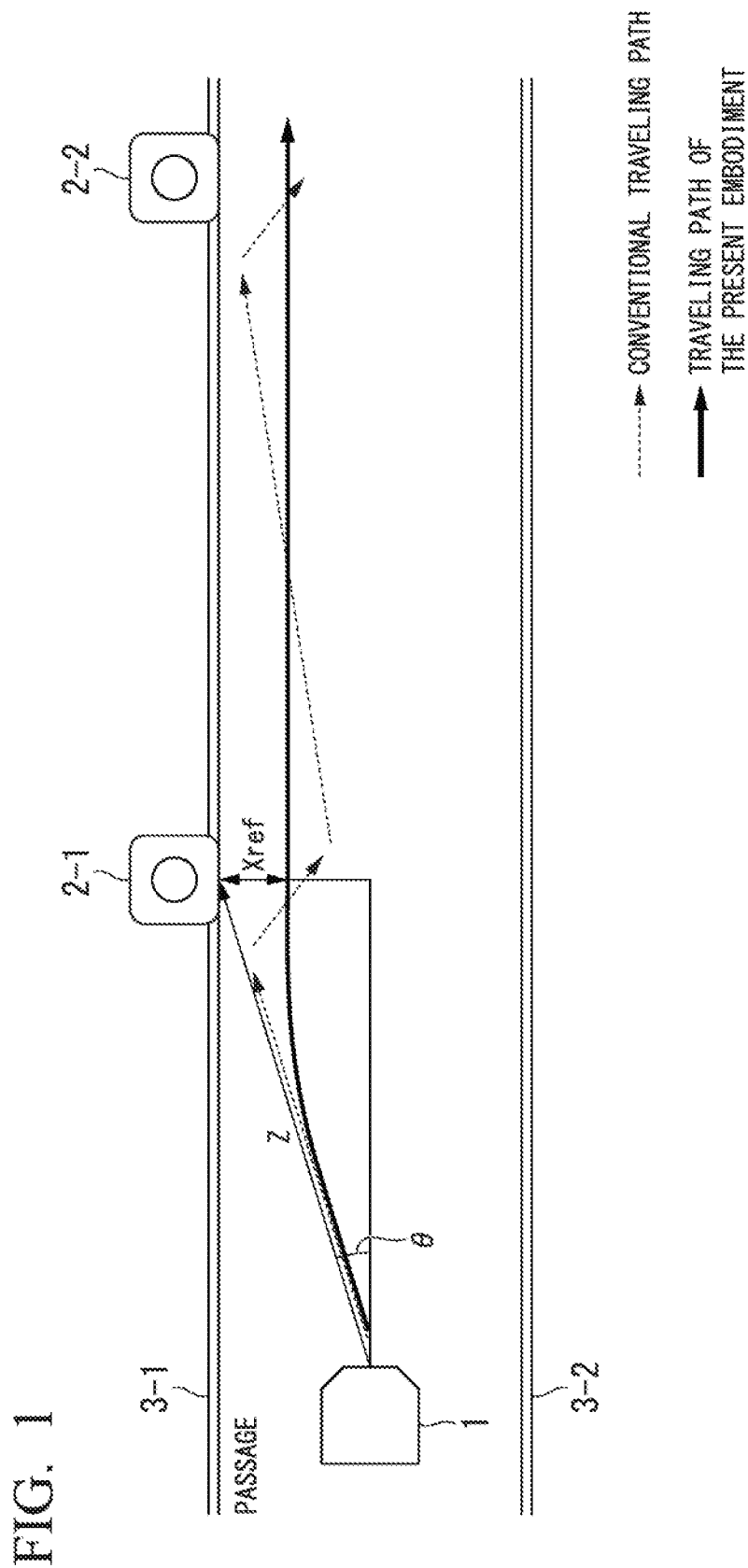
FIG. 1 is a diagram showing an example of movement of a mobile robot according to the present embodiment.

Hereinafter, a mobile robot and a control method according to an embodiment of the present invention will be described with reference to the drawings. FIG. 1 is a diagram showing an example of movement of the mobile robot 1 according to the present embodiment. The mobile robot 1 detects a beacon 2 (2-1 and 2-2) disposed along a boundary 3 (3-1 and 3-2) defining a passage and based on a position of the detected beacon 2, moves toward a destination point while keeping a constant distance from the boundary 3. A beacon ID that uniquely identifies each beacon is assigned to the beacon 2 which is a transmitter. The beacon 2 transmits an infrared signal including a signal indicating the beacon ID. The beacon ID is represented by, for example, a periodic change in the infrared signal. The boundary 3 defining the passage is, for example, a wall or a partition.

In the example of movement shown in FIG. 1, the mobile robot 1 moves while keeping a constant distance from a left side boundary 3-1 with respect to a traveling direction of the mobile robot 1. In order to keep a constant distance Xref from the boundary 3-1, the mobile robot 1 acquires a distance Z and a direction θ to a detected beacon 2-1, and calculates a traveling direction in which the distance Z and the direction θ satisfy a predetermined condition. The mobile robot 1 moves in the calculated traveling direction. The direction θ is an angle formed by the traveling direction of the mobile robot 1 and the direction of the detected beacon 2-1. The traveling direction satisfying the predetermined condition is a traveling direction in which the direction θ is arcsin(Xref/Z). When the distance Z to the beacon 2-1 becomes closer than a predetermined switching threshold, the mobile robot 1 switches a target to a beacon 2-2 and moves. A range in which a distance from the mobile robot 1 is closer than the switching threshold is referred to as a switching range.

In FIG. 1, a traveling path of a conventional method is represented by a broken line as a comparative example. The traveling path of a conventional method is a route in which the mobile robot moves toward a target beacon and when the mobile robot has approached to a certain distance to the beacon, the mobile robot moves to the next target beacon. In a conventional traveling path, since the mobile robot 1 temporarily moves away from a target beacon 2 and switches the target beacon 2. When the mobile robot 1 has approached to a certain distance from the beacons 2-1 or 2-2, the traveling path becomes zigzag in the vicinity of the beacons 2, so that a traveling distance becomes longer. On the contrary, since the traveling path of the mobile robot 1 according to the present embodiment moves while keeping a constant distance Xref from the boundary 3-1, the traveling distance can be reduced without redundant movement.

First Embodiment

Figure 2:
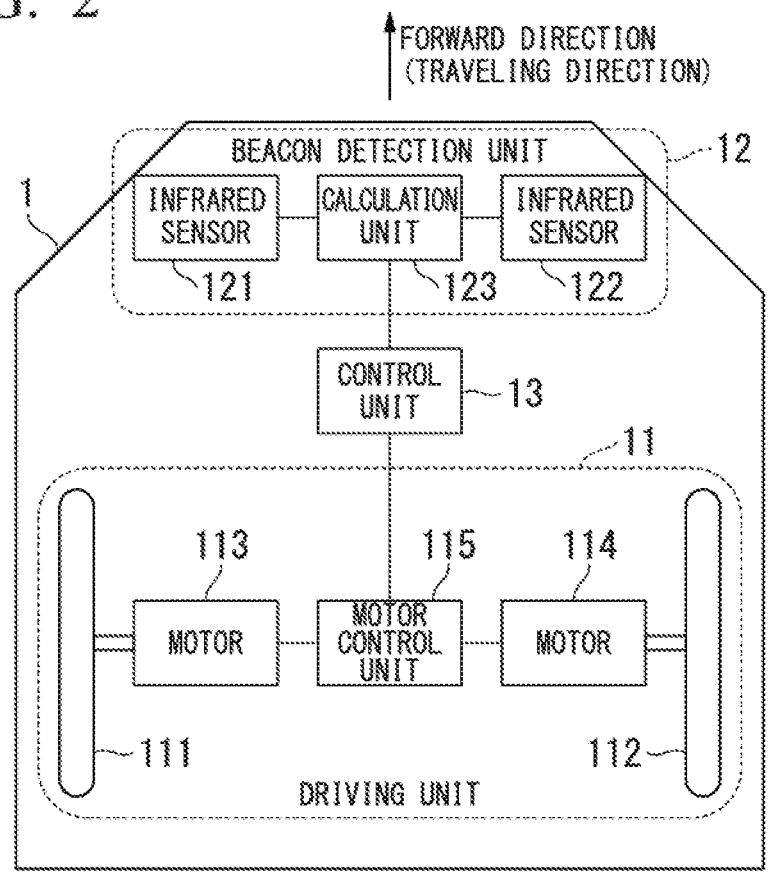
FIG. 2 is a block diagram showing an example of a configuration of a mobile robot according to a first embodiment.

FIG. 2 is a block diagram showing an example of a configuration of a mobile robot 1 according to a first embodiment. The mobile robot 1 includes a driving unit 11 a beacon detection unit 12, and a control unit 13.

The driving unit 11 includes driving wheels 111, 112, motors 113, 114, and a motor control unit 115. The driving wheel 111 is provided on a left side with respect to a traveling direction of the mobile robot 1.

The driving wheel 112 is provided on a right side with respect to the traveling direction of the mobile robot 1. The motor 113 rotates the driving wheel 111 under the control of the motor control unit 115. The motor 114 rotates the driving wheel 112 under the control of the motor control unit 115. The motor control unit 115 supplies electric power to the motors 113, 114 based on angular velocity command values for the motors 113, 114 input from the control unit 13.

As the motors 113, 114 rotate at an angular velocity corresponding to the electric power supplied from the motor control unit 115, the bile robot 1 moves forward or backward. Also, by generating a difference in the angular velocities of the motors 113, 114, the traveling direction of the mobile robot 1 is changed. For example, by making the angular velocity of the left driving wheel 111 greater than the angular velocity of the right driving wheel 112 during forward movement, the mobile robot 1 moves while turning right. In addition, by rotating the driving wheels 111, 112 in opposite directions, the mobile robot 1 turns around without changing its position. Also, in order to stabilize the posture of the mobile robot 1, the mobile robot 1 may have wheels other than the driving wheels 111, 112.

The beacon detection unit 12 includes infrared sensors 121, 122 and a calculation unit 123. The infrared sensor 121 is attached to a left side of a front surface of the mobile robot 1 and detects infrared signals transmitted from the beacon 2 positioned in front of the mobile robot 1. The infrared sensor 122 is attached to a right side of the front surface of the mobile robot 1 and detects infrared signals transmitted from the beacon 2 positioned in front of the mobile robot 1. The infrared sensors 121, 122 are attached to a casing of the mobile robot 1 symmetrically with respect to a straight line passing in a forward direction through a center of the mobile robot 1. For the infrared sensors 121, 122, for example, an image pickup element combining an infrared filter is used. The beacon 2 is detected by detecting a change in luminance in an image captured by the infrared sensor 121, 122.

The calculation unit 123 calculates a distance Z and a direction θ from the mobile robot 1 to the beacon 2 based on a difference between a position of a target beacon 2 in the image captured by the infrared sensor 121 and a position of the target beacon 2 in the image captured by the infrared sensor 122. When the images captured by the infrared sensors 121, 122 include signals transmitted from a plurality of beacons 2, the calculation unit 123 detects a beacon ID of a target beacon 2 and calculates the distance Z and the direction θ to the target beacon 2. Detection of the beacon ID is performed, for example, by detecting a periodic change in a signal corresponding to the beacon ID in images that are continuous in time series. The calculation unit 123 outputs beacon information including the calculated distance Z and direction θ and the beacon ID to the control unit 13. The calculated distance Z is a distance from a center on a line segment connecting the infrared sensor 121 and the infrared sensor 122. If the infrared sensors 121, 122 are attached such that the line segment connecting the infrared sensor 121 and the infrared sensor 122 is orthogonal to the traveling direction of the mobile robot 1, a calculation load in the calculation unit 123 can be reduced.

Figure 3:
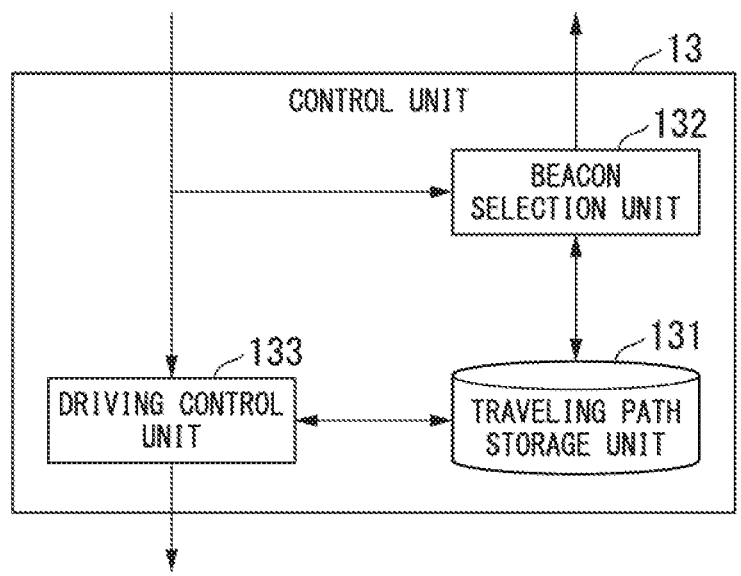
FIG. 3 is a block diagram showing an example of a configuration of a control unit according to the first embodiment.

The control unit 13 controls the driving unit 11 based on the beacon information acquired from the beacon detection unit 12. FIG. 3 is a block diagram showing an example of a configuration of the control unit 13. The control unit 13 includes a traveling path storage unit 131, a beacon selection unit 132, and a driving control unit 133. A table that contains attribute information of a plurality of beacons 2 disposed along the traveling path of the mobile robot 1 is stored in the traveling path storage unit 131 in advance. The beacon selection unit 132 outputs the beacon ID of the target beacon 2 to the beacon detection unit 12 based on the table stored in the traveling path storage unit 131. The beacon selection unit 132 determines whether or not to switch the target beacon 2 based on the beacon information input from the beacon detection unit 12. When switching the target beacon 2, the beacon selection unit 132 selects the next beacon 2 after the current target beacon 2 from the table.

The driving control unit 133 reads attribute information and control information from the table stored in the traveling path storage unit 131 based on the beacon information output from the beacon detection unit 12. The attribute information is information on the target beacon 2. The control information is information indicating control associated with the target beacon 2. The control associated with the beacon 2 is, for example, control of stopping in the vicinity of the beacon 2 indicating a target point, control of turning around in the vicinity of the beacon 2 indicating a change of the traveling direction, and the like. The driving control unit 133 controls the driving unit 11 based on the beacon information, the attribute information, and the control information.

FIG. 4 is a diagram showing an example of a table stored in the traveling path storage unit 131. The table has columns for items including "Beacon ID," "Passage distance," "Installation side," "Direction change," and "Last beacon." Each row is attribute information that exists for each beacon. Each row in the table is disposed in the order of the beacons 2 passed by when the mobile robot 1 moves along the traveling path. The "Beacon ID" column includes the beacon ID of the beacon 2 corresponding to the row. The "Passage distance" column includes a distance indicating how far the beacon 2 corresponding to the row is positioned away from a boundary 3 of a passage. When the beacon 2 is placed on the boundary 3, the passage distance is 0 (zero). When the beacon 2 is positioned at a position distant from the traveling path, the distance from the beacon 2 to the boundary 3 is the passage distance. For example, a negative passage distance may be taken as that in a direction toward the traveling path, and a positive passage distance may be taken as that in a direction away from the traveling path.

The "Installation side" column includes information indicating whether the beacon 2 corresponding to the row is disposed on a right side or a left side of the mobile robot 1 when the mobile robot 1 moves along the traveling path. The "direction change" column includes rotation information indicating a change in the traveling direction of the mobile robot 1 when the mobile robot 1 has approached to a predetermined distance or a switching threshold with respect to the beacon 2 corresponding to the row. When the rotation information is 0 degrees, this indicates that there is no change in the traveling direction of the mobile robot 1. When the rotation information is other than 0 degrees, the traveling direction of the mobile robot 1 changes clockwise or counterclockwise by the angle indicated by the rotation information. The "last beacon" column includes information indicating whether or not the beacon 2 corresponding to the row is a beacon 2 indicating the target point on the traveling path. In the table shown in FIG. 4, the beacon 2 having the beacon ID "M" indicates the target point. There is one beacon 2 indicating the target point.

Figure 5:
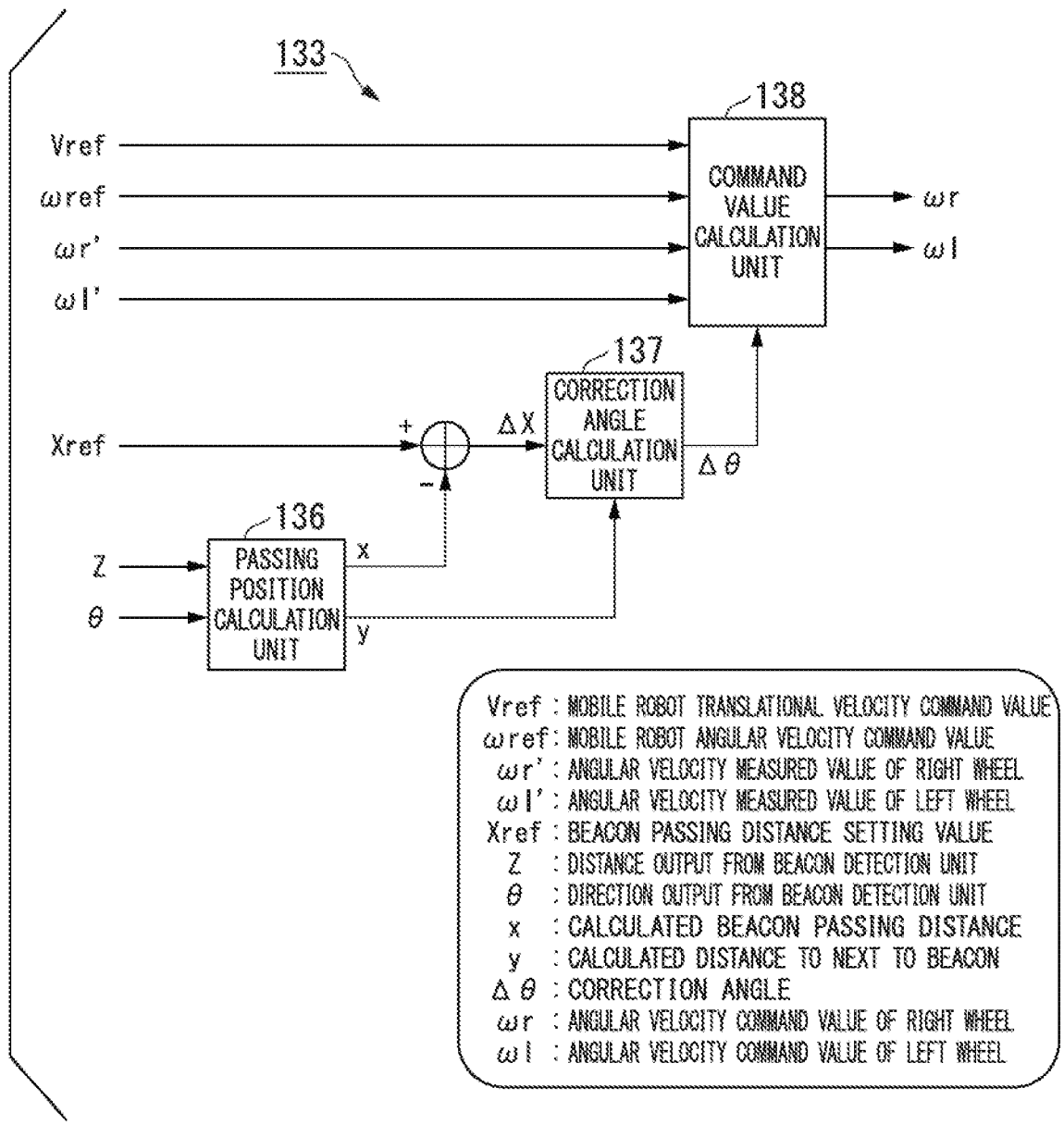
FIG. 5 is a block diagram showing an example of a configuration relating to control based on beacon information in a driving control unit.

FIG. 5 is a block diagram showing an example of a configuration relating to control based on the beacon information in the driving control unit 133. The driving control unit 133 includes a passing position calculation unit 136, a correction angle calculation unit 137, and a command value calculation unit 138. The passing position calculation unit 136 inputs the distance Z and the direction θ to the beacon 2 which are included in the beacon information. Based on the distance Z and the direction θ, the passing position calculation unit 136 calculates a distance x to the beacon 2 when having approached to a position closest to the beacon 2 by moving in the current traveling direction of the mobile robot 1, and a traveling distance y to the position closest to the beacon 2.

The position when the mobile robot 1 has approached closest to the beacon 2 is an intersection between a straight line which passes through the position of the beacon 2 and is orthogonal to a traveling straight line extending in the traveling direction from the position of the mobile robot 1, and the traveling straight line. The distance x is obtained as (Z·sin θ). The traveling distance y is obtained as (Z·cos θ). The distance x is also called a beacon passing distance. The traveling distance y is also referred to as the distance to being beside the beacon.

The correction angle calculation unit 137 inputs a difference ΔX obtained by subtracting the distance x from a distance Xref from the boundary of the passage to the traveling path, and the traveling distance y. The correction angle calculation unit 137 calculates a collection angle Δθ with respect to the traveling direction of the mobile robot 1 based on the difference ΔX and the traveling distance y. Specifically, the correction angle calculation unit 137 sets a value obtained from arctan(ΔX/y) as the correction angle Δθ.

The command value calculation unit 138 inputs a translational velocity command value Vref, an angular velocity command value ωref, angular velocity measured values ωl' and ωr', and the correction angle Δθ. The translational velocity command value Vref is a command value (a target value) for a translation velocity of the mobile robot 1. The angular velocity command value ωref is an angular velocity at the time of changing a moving direction in the clockwise direction or in the counterclockwise direction with reference to the traveling direction as a reference. The angular velocity command value ωref may be determined by setting a variation amount in the clockwise direction to a positive value, or may be determined by setting a variation amount in the counterclockwise direction to a positive value. The angular velocity measured values ωl' and ωr' are the respective velocities measured by encoders provided in the motors 113, 114. Based on the translational velocity command value Vref, the angular velocity command value ωref, the angular velocity measured values ωl' and ωr', and the correction angle Δθ, the command value calculation unit 138 calculates angular velocity command values ωl and ωr for changing the traveling direction by the correction angle Δθ while moving the mobile robot 1 in accordance with the translational velocity command value Vref and the angular velocity command value ωref. The command value calculation unit 138 outputs the calculated angular velocity command values ωl and ωr to the driving unit 11.

Figure 6:
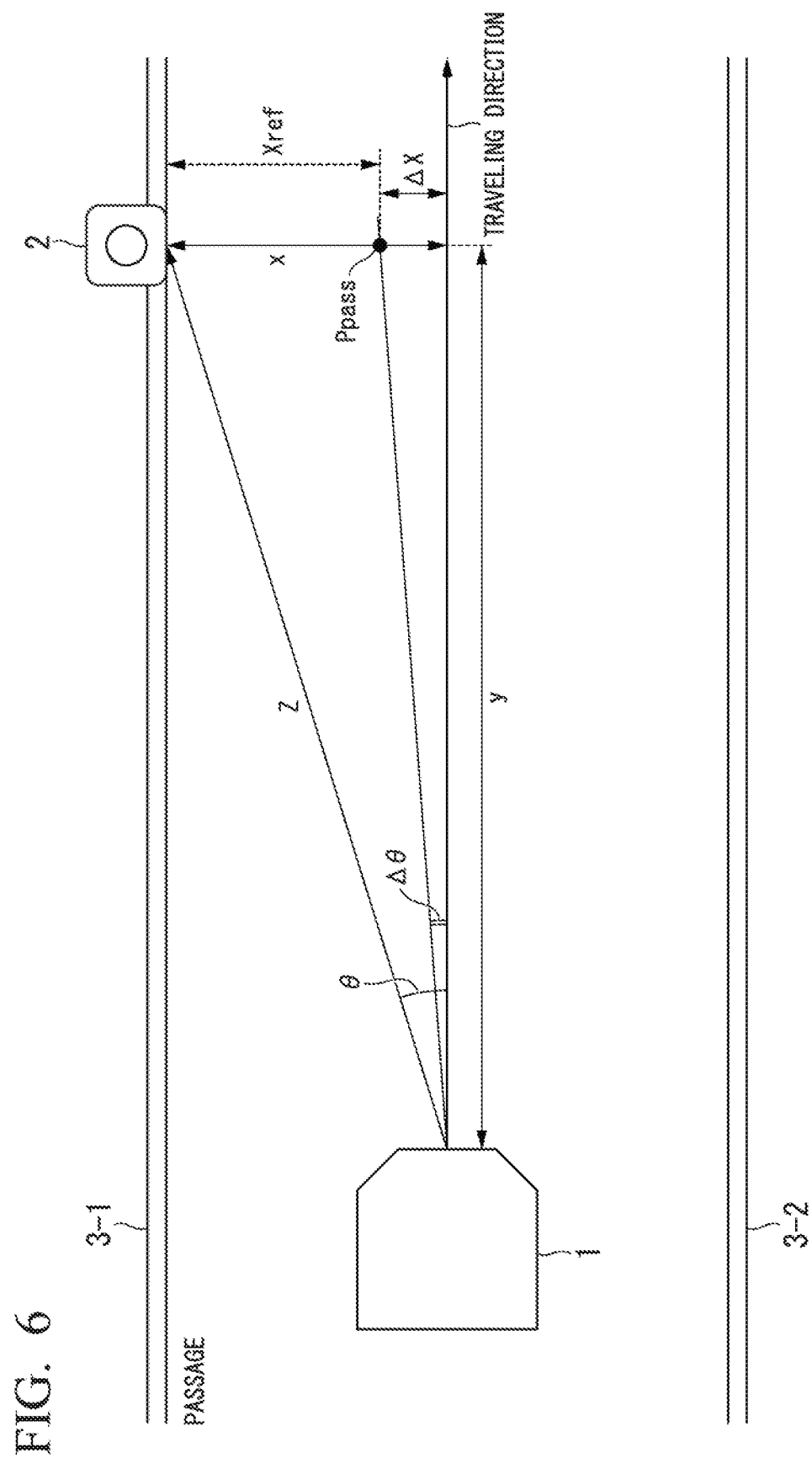
FIG. 6 is a diagram showing a correction angle $\Delta\theta$ calculated by the driving control unit.

FIG. 6 is a diagram showing a correction angle Δθ calculated by the driving control unit 133. By detecting the beacon 2 disposed on the boundary 3-1, the beacon detection unit 12 obtains the distance Z from the mobile robot 1 to the beacon 2 and the direction θ to the position of the beacon 2 with reference to the traveling direction of the mobile robot 1 as a reference direction. The passing position calculation unit 136 calculates the distance x and the traveling distance y from the distance Z and the direction θ. It is necessary for the mobile robot 1 to change traveling direction in order to pass through a position $P_{pass}$ which is distant by a constant distance Xref from the beacon 2 disposed along the traveling path. The position $P_{pass}$ is determined based on information indicating the "installation side" in the attribute information of the beacon 2. FIG. 6 shows a case where the beacon 2 is set on the left side of the traveling path.

In the example shown in FIG. 6, when the mobile robot 1 moves while maintaining the current traveling direction, the mobile robot 1 passes through a position that is distant as long as the difference ΔX from the position $P_{pass}$. Therefore, the correction angle calculation unit 137 calculates the correction angle Δθ with respect to the traveling direction based on the difference ΔX and the traveling distance y. The command value calculation unit 138 calculates the angular velocity command values ωl and ωr for changing the traveling direction counterclockwise by the correction angle $\Delta\theta$ and controls the driving unit 11 while moving the mobile robot 1 based on the translational velocity command value Vref and the angular velocity command value ωref. In this manner, the driving control unit 133 controls the driving unit 11, so that the mobile robot 1 can move on the traveling path defined at a position separated as long as the constant distance Xref from the boundary 3-1 of the passage.

Also, in the example shown in FIG. 6, the case where the beacon 2 is disposed on the boundary 3-1 has been described.

However, when the beacon 2 cannot be disposed on the boundary 3, the difference between the position where the beacon 2 is disposed and the boundary 3 is stored in the table as the passage distance ($D_1$, $D_2$, . . . , and $D_M$). In this case, when calculating the correction angle $\Delta\theta$, the correction angle calculation unit 137 corrects either the distance Xref or the difference $\theta X$ by using the passage distance.

Figure 7:
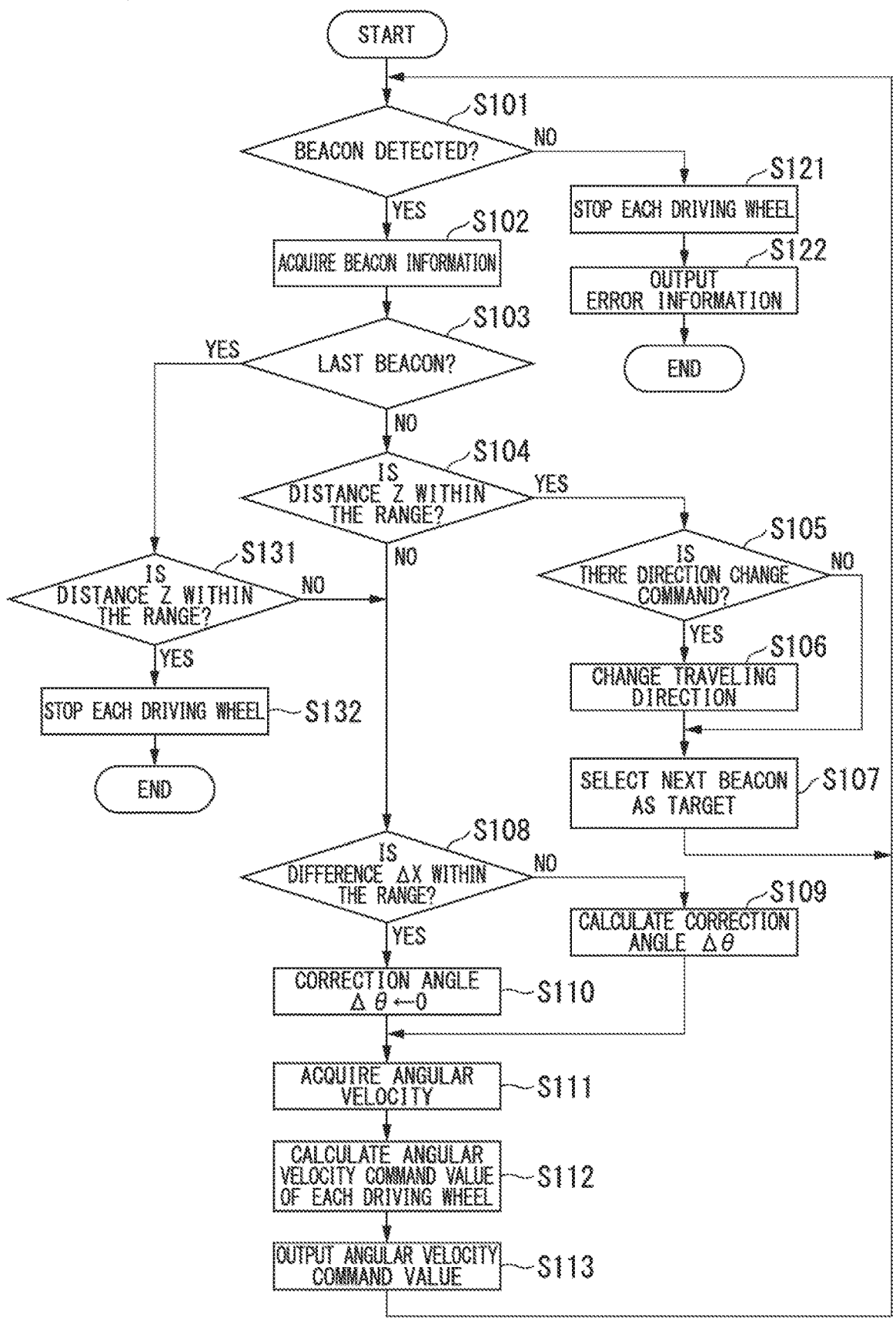
FIG. 7 is a flowchart showing movement control processing of the control unit.

FIG. 7 is a flowchart showing a movement control processing by the control unit 13. When the movement of the mobile robot 1 is started, the beacon selection unit 132 outputs the beacon ID of the target beacon 2 to the beacon detection unit 12. In an initial state, the beacon selection unit 132 selects the beacon ID stored in the first row of the table as the beacon ID of the target beacon 2. The beacon detection unit 12 determines whether or not the target beacon 2 can be detected (step S101).

When the beacon 2 cannot be detected (NO in step S101), the beacon detection unit 12 outputs an error signal indicating that the beacon 2 could not be detected. In accordance with the error signal, the driving control unit 133 controls the driving unit 11 to stop the driving wheels (step S121). In response to the error signal, the beacon selection unit 132 outputs error information indicating that the beacon 2 cannot be detected to the outside (step S122) and terminates the movement control processing. The error information is output using an output device provided in the mobile robot 1, for example, a speaker or a display.

When the beacon 2 can be detected in step S101 (YES in step S101), the beacon selection unit 132 and the driving control unit 133 acquire the beacon information from the beacon detection unit 12 (step S102). The beacon selection unit 132 deter lines whether or not the beacon 2 indicated by the beacon information is the last beacon based on the table (step S103).

When the beacon 2 is the last beacon (YES in step S103), the driving, control unit 133 determines whether or not the distance Z to the beacon 2 indicated by the beacon information is within the switching range (step S131). When the distance Z to the beacon 2 is within the switching range (YES in step S131), the driving control unit 133 controls the driving unit 11 to stop the driving wheels (step S132) and terminates the movement control processing.

In step S131, if the distance Z to the beacon 2 is not within the switching range (NO in step S131), the driving control unit 133 controls the process to proceed to step S108.

In step S103, when the beacon 2 is not the last beacon (NO in step S103), the driving control unit 133 determines whether or not the distance Z to the beacon 2 indicated by the beacon information is within the switching range (step S104). When the distance Z to the beacon 2 is not within the switching range (NO in step S104), the driving control unit 133 controls the process to proceed to step S108.

In step S104, when the distance Z to the beacon 2 is within the switching range (YES in step S104), the driving control unit 133 determines whether or not there is a direction change instruction in the attribute information of the beacon 2 based on the table (Step S105). When there is no direction change instruction (NO in step S105), the driving control unit 133 controls the process to proceed to step S107.

When there is a direction change instruction (YES in step S105), the driving control unit 133 acquires a rotation information of the beacon 2 from the table and controls the driving runt 11 to change the traveling direction of the mobile robot 1 by the angle indicated by the rotation information (step S106). The beacon selection unit 132 acquires a beacon ID of a beacon 2 which will be a next target of the currently targeted beacon 2 from the table. The beacon selection unit 132 outputs the beacon 2 of the acquired beacon ID to the beacon detection unit 12 to select the beacon 2 of the acquired beacon ID as a new target (step S107) and returns the process to step S101.

The correction angle calculation unit 137 determines Whether or not the difference $\Delta X$ calculated based on the beacon information acquired from the beacon detection unit 12 is within an allowable range (step S108). The allowable range for the difference $\Delta X$ is predetermined based on the accuracy of movement required for the mobile robot 1, the accuracy of detection of the beacon 2 in the beacon detection unit 12, the accuracy in controlling the motors 113, 114, and the like. In a case where the difference $\Delta X$ is not within the allowable range (NO in step S108), the correction angle calculation unit 137 calculates the correction angle $\Delta\theta$ based on the difference $\Delta X$ (step S109).

When the difference $\Delta X$ is within the allowable range (YES in step S108), the correction angle calculation unit 137 sets the correction angle $\Delta\theta$ to 0 (step S110).

The command value calculation unit 138 acquires the angular velocity measured values ωl' and ωr' of the motors 113, 114 that drive the driving wheels 111, 112 (step S111). Based on the translational velocity command value Vref, the angular velocity command value ωref, the angular velocity measured values ωl' and ωr', and the correction angle $\Delta\theta$, the command value calculation unit 138 calculates angular velocity command values ωl and or ωr the motors 113, 114 (Step S112). The command value calculation unit 138 outputs the angular velocity command values ωl and ωr to the driving unit 11 (step S113), and returns the process to step S101.

The control unit 13 carries out the movement control processing including each process from step S101 to step S132, so that the distance Z and the direction θ to the beacon 2 can be successively acquired, thereby correcting the traveling direction. As the traveling direction of the mobile robot 1 is corrected by the movement control processing, the mobile robot 1 can move alone the traveling path separated a constant distance Xref from the boundary 3, whereby the traveling distance when moving based on a plurality of beacons can be reduced.

Figure 8:
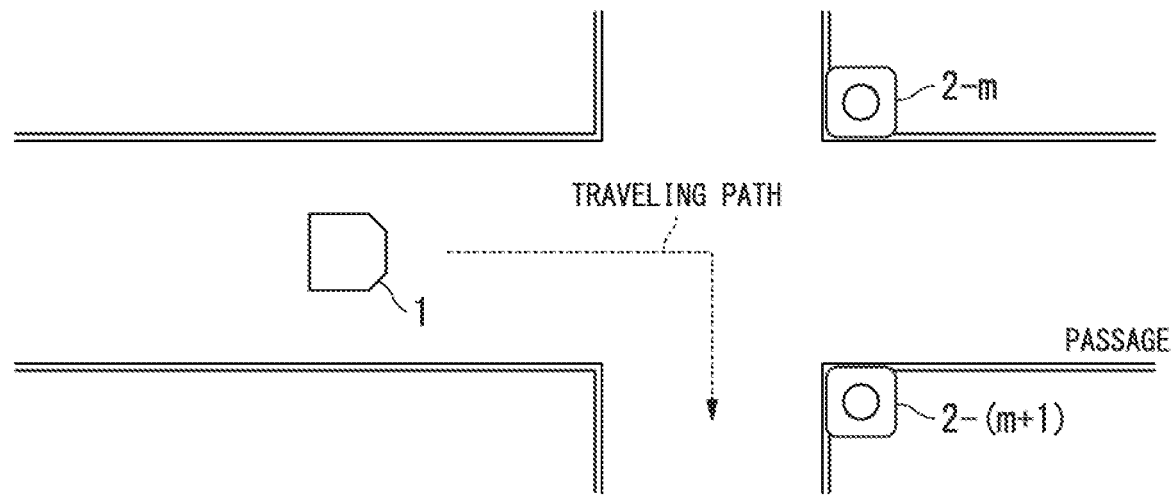
FIG. 8 is a diagram showing an example of an arrangement of beacons when an intersection exists in a path through which the mobile robot moves.
Figure 9:
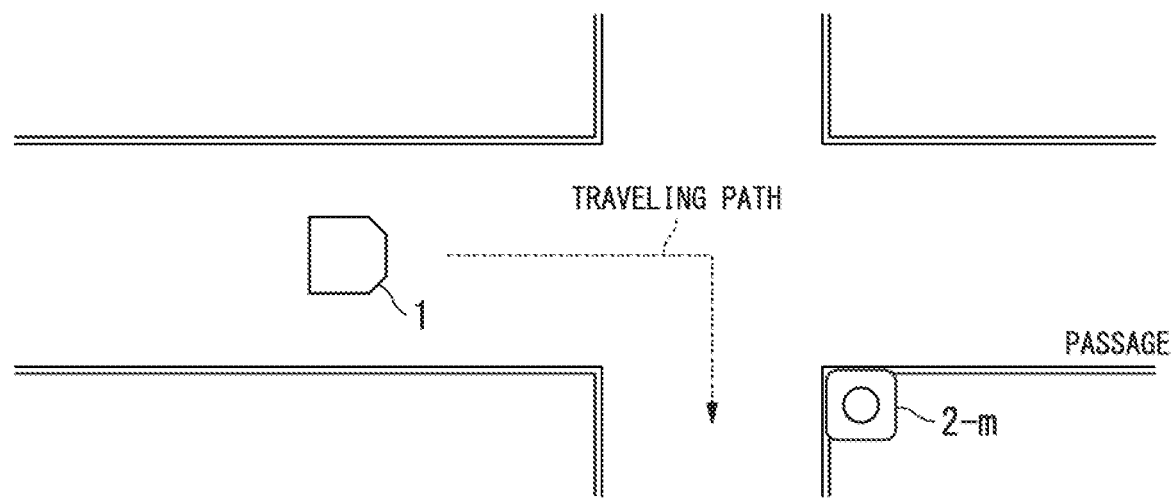
FIG. 9 is a diagram showing an example of an arrangement of beacons when an intersection exists in a path through which the mobile robot moves.

FIGS. 8 and 9 are diagrams showing an example of arrangement of the beacon 2 in the case where there is an intersection in the path through which the mobile robot 1 moves. FIG. 8 shows an example in which beacons 2-$m$ and 2-($m$+1) are installed at two corners on a far side of the intersection as viewed from the mobile robot 1. As shown in FIG. 8, when two beacons 2-$m$ and 2-($m$+1) are disposed, the mobile robot 1 may move to positions where the distances Z and Z' to the two beacons are within the switching range and may change the traveling direction by turning the angle indicated by the rotation information. FIG. 9 shows an example in which the beacon 2-$m$ is installed at one corner on a changed destination side of the traveling direction among the two corners on the far side of the intersection as viewed from the mobile robot 1. As shown in FIG. 9, when the beacon 2-*m* is installed, the mobile robot 1 may move to a position where the distance Z to the beacon is within the switching range and may change the traveling direction by turning the angle indicated by the rotation information.

Second Embodiment

Figure 10:
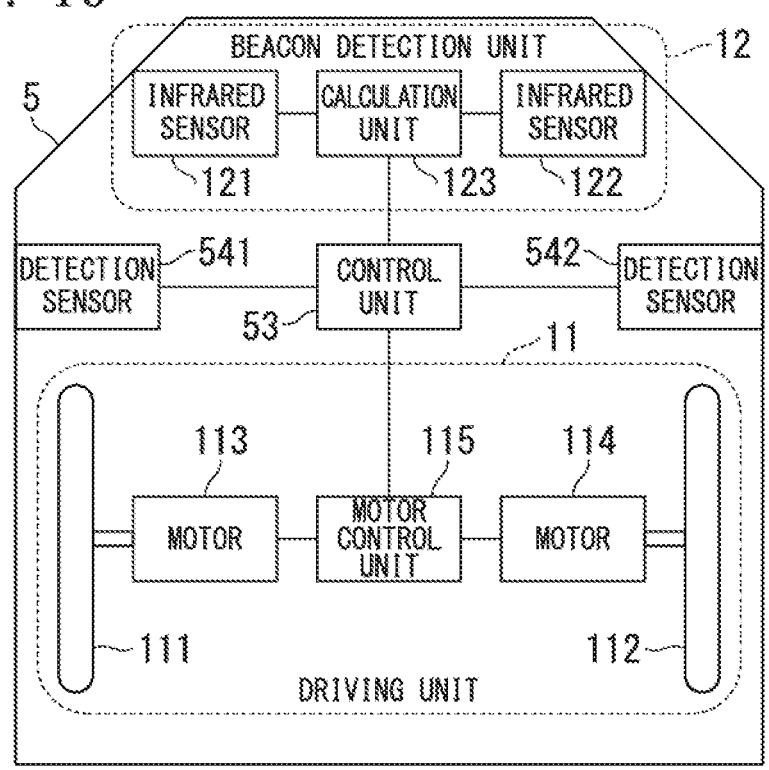
FIG. 10 is a block diagram showing an example of a configuration of a mobile robot according to a second embodiment.

FIG. 10 is a block diagram showing an example of configuration of a mobile robot 5 according to a second embodiment.

The mobile robot 5 includes a driving unit 11, a beacon detection unit 12, a control unit 53, and detection sensors 541, 542. The mobile robot 5 is different from the mobile robot 1 according to the first embodiment in that the mobile robot 5 includes a control unit 53, instead of the control unit 13, and detection sensors 541, 542. In the mobile robot 5, the same components as those of the mobile robot 1 are denoted by the same reference numerals, and redundant explanations are omitted.

The detection sensor 541 is attached to a left side surface of a casing with respect to a traveling direction of the mobile robot 5 and detects a distance to an object positioned on a left side of the traveling direction. The detection sensor 542 is attached to a right side surface of the casing with respect to the traveling direction of the mobile robot 5 and detects a distance to the object positioned on a right side of the traveling direction. For example, an ultrasonic sensor or a laser range finder (LRF) may be used as the detection sensors 542. The detection sensors 541, 542 perform detection at a predetermined cycle and output the detected distance to the control unit 53.

Figure 11:
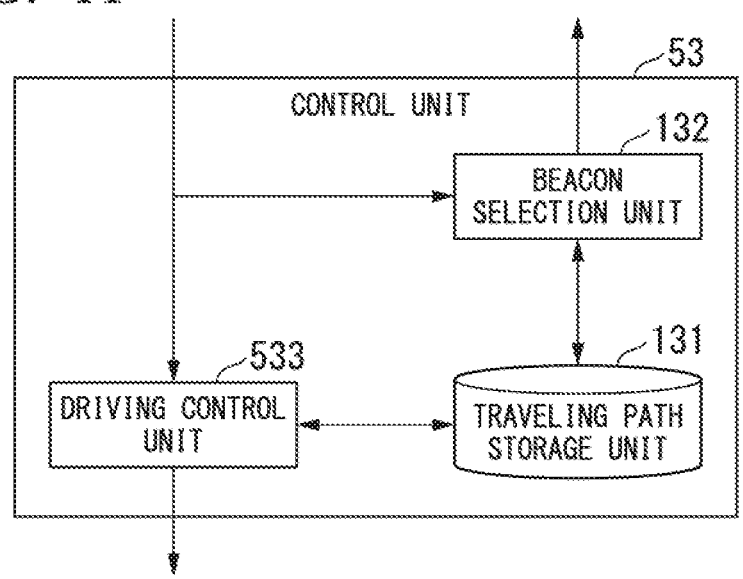
FIG. 11 is a block diagram showing an example of a configuration of a control unit according to the second embodiment.

FIG. 11 is a block diagram shown an example of configuration of the control unit 53. The control unit 53 includes a traveling path storage 131, a beacon selection unit 132, and a driving control unit 533. The driving control unit 533 controls the driving unit 11 based on the beacon information output from the beacon detection unit 12, a table stored in the traveling path storage unit 131, and a distance output from the detection sensors 541, 542.

Figure 12:
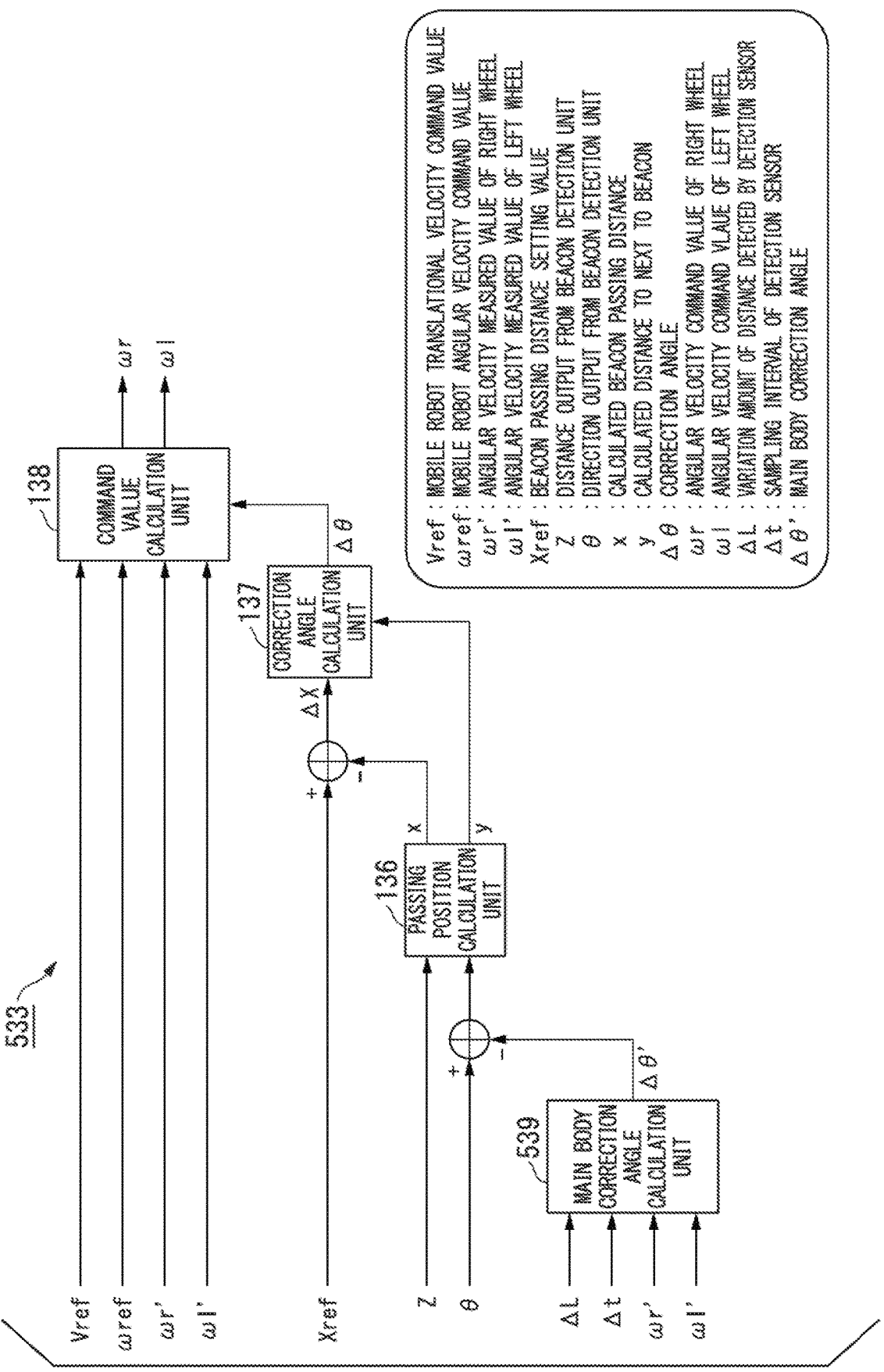
FIG. 12 is a block diagram showing an example of a configuration relating to control based on beacon information in a driving control unit according to the second embodiment.

FIG. 12 is a block diagram showing an example of configuration relating to a control based on the beacon information in the driving control 33. The driving control unit 533 includes a main body correction angle calculation unit 539, a passing position calculation unit 136, a correction angle calculation unit 137, and a command value calculation unit 138. The driving control unit 533 is different from the driving control unit 133 of the first embodiment in that a main body correction angle calculation unit 539 is provided. The main body correction angle calculation unit 539 inputs a variation amount $\Delta L$ of the detection distance, a sampling interval $\Delta t$, and the angular velocity measured values $\omega l'$ and $\omega r'$ of the motors 113, 114. The variation amount $\Delta L$ of the detection distance is a changing an omit of a distance detected by the detection sensor 541 or the detection sensor 542 at the sampling interval $\Delta t$.

One of the variation amount $\Delta L$ of the distance detected by the detection sensor 541 or the variation amount $\Delta L$ of the distance detected by the detection sensor 542 is determined according to whether the mobile robot 5 moves along the left or right boundary 3, and may be input to the calculation unit 539. Alternatively, the main body correction angle calculation unit 539 may use both of the distance variation amounts $\Delta L$ detected by the detection sensors 541, 542, respectively. When both the variation amounts $\Delta L$ are used, the main body correction angle calculation unit 539 may use the average value of both variation amounts $\Delta L$, or may use the larger variation amount $\Delta L$ or the smaller variation amount $\Delta L$. Further, when one variation amount $\Delta L$ cannot be obtained due to failing, the main body correction angle calculation unit 539 uses the other variation amount $\Delta L$.

The main body correction angle calculation unit 539 calculates the main body correction angle $\Delta \theta'$ based on the variation amount $\Delta L$ at the sampling interval $\Delta t$ and the angular velocity measured values $\omega l'$ and $\omega r'$. The main body correction angle $\Delta \theta'$ is an angle for correcting the traveling direction of the mobile robot 5 so that the mobile robot 5 keeps a constant distance Xref with respect to the boundary 3. In place of the direction $\theta$ of the beacon 2, a value obtained by subtracting the body correction angle $\Delta \theta'$ from the direction $\theta$ of the beacon 2 is input to the passing position calculation unit 136.

Figure 13:
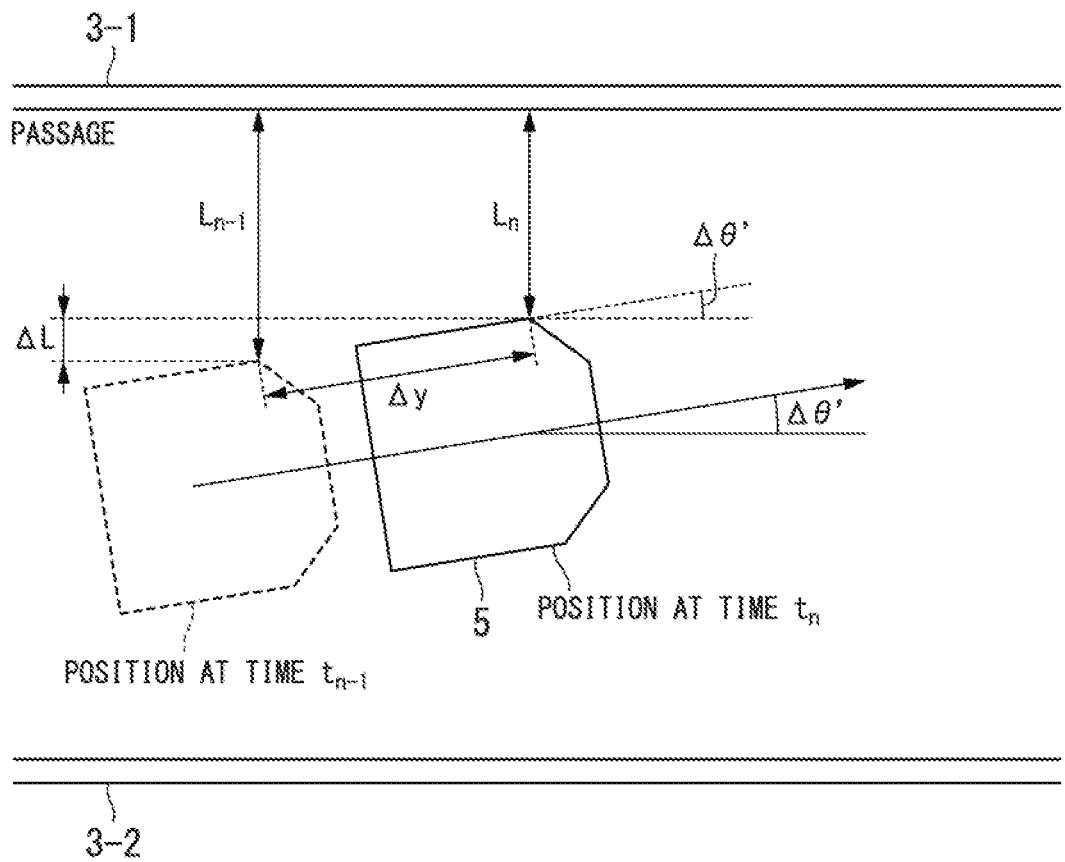
FIG. 13 is a diagram showing a main body correction angle $\Delta\theta'$ calculated by a main body correction angle calculating unit according to the second embodiment.

FIG. 13 is a diagram showing the main body correction angle $\Delta \theta'$ calculated by the main body correction angle calculation unit 539. When the traveling direction of the mobile robot 5 is not parallel to the boundary 3-1, the distance between the mobile robot 5 and the boundary 3-1 changes as the mobile robot 5 moves. In FIG. 13, the distance between the mobile robot 5 and the boundary 3-1 at time $t_{n-1}$ is $L_{n-1}$ and the distance between the mobile robot 5 and the boundary 3-1 at time $t_n (=t_{n-1}+\Delta t)$ is $L_n$. The inclination $\Delta \theta'$ of the traveling direction of the mobile robot 5 with respect to the boundary 3-1 is obtained by arcsin($\Delta L / \Delta y$). $\Delta L$ is the difference between the distance $L_{n-1}$ and the distance $L_n$. $\Delta y$ is the distance traveled by the mobile robot 5 during the period from time $t_{n-1}$ to time $t_n$. The traveling distance $\Delta y$ is the product of the moving velocity of the mobile robot 5 obtained from the angular velocity measured values $\omega l'$ and $\omega r'$ and the time $\Delta t$. The main body correction angle calculation unit 539 calculates the inclination of the traveling direction of the mobile robot 5 as the main body correction angle $\Delta \theta'$ based on the variation amount $\Delta L$ of the distance to the boundary 3 obtained by the detection sensors 541, 542.

Figure 14:
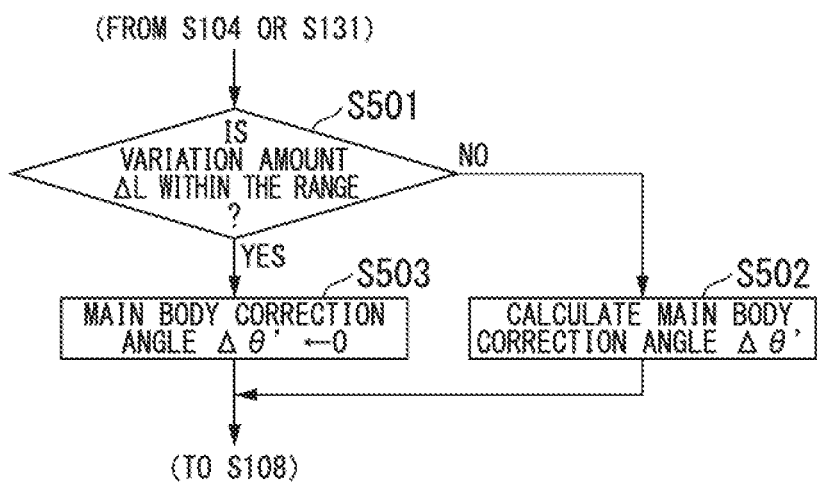
FIG. 14 is a flowchart showing a part of movement control processing according to the second embodiment.

FIG. 14 is a flowchart showing a part of a movement control processing in the second embodiment.

The flowchart shown in FIG. 14 shows a difference between the movement control processing in the first embodiment and the movement control processing in the second embodiment. The movement control processing in the second embodiment is represented by a flowchart in which the process from step S501 to step S503 shown in FIG. 14 is added between the steps S104, S131 and step S108 in the flowchart shown in FIG. 7.

When the processing is shifted from step S104 or step S131, the main body correction angle calculation unit 539 determines whether or not the variation amount $\Delta L$ is within the allowable range (step S501). The allowable range for the variation amount $\Delta L$ is determined in advance in the same manner as the allowable range for the difference $\Delta X$. When the variation amount $\Delta L$ is not within the allowable range (NO in step S501), the main body correction angle calculation unit 539 calculates the main body correction angle $\Delta \theta$ based on the variation amount $\Delta L$, the sampling interval $\Delta t$, and the angular velocity measured values $\omega l'$, and $\omega r'$ (Step S502), and advances the process to step S108. When the variation amount $\Delta L$ is within the allowable range (YES in step S501), the main body correction angle calculation unit 539 sets the main body correction angle $\Delta \theta'$ to 0 and advances the process to step S108.

The driving control unit 533 calculates the correction angle $\Delta \theta$ based on the main body correction angle $\Delta \theta'$ calculated by the main body correction angle calculation unit 539, the distance Z and the direction $\theta$ of the beacon 2, and the distance Xref. The mobile robot 5 controls the traveling direction to suppress a distance change from the boundary 3 based on the translation velocity command value Vref, the angular velocity command value ωref, the angular velocity measurement values ωl' and ωr', the distance Xref, the distance Z and the direction θ of the beacon 2 and the variation amount ΔL obtained by the detection sensors 541, 542. With this control, movement with high accuracy along the traveling path can be performed, and the traveling distance when moving based on a plurality of beacons can be reduced.

According to the mobile robot of each of the above-described embodiments, by providing the control unit which acquires the distance Z and the direction θ to the beacon 2 detected by the beacon detection unit 12, calculates the traveling direction in which the distance Z to the beacon 2 and the direction θ of the beacon 2 satisfy the predetermined relationship, and controls the driving unit 11 based on the calculated traveling direction, it is possible to reduce the traveling distance when moving based on a plurality of beacons.

In addition, since the detection sensors 541, 542 for detecting the object positioned on the side surface of the mobile robot are provided, and the control unit calculates the traveling direction such that the distance to the detected object is constant, it is possible to suppress a distance change from the boundary 3 and move with high accuracy along the traveling path.

Further, by including information indicating the installation side, which indicates on which of a left side and a right side of the traveling path the beacon 2 is disposed, in the table stored in the traveling path storage unit 131, it is possible to increase the degree of freedom in the arrangement of the beacon 2 and to facilitate the setting of the traveling path.

In addition, by including the operation associated with the beacon 2 in the table stored in the traveling path storage unit 131, setting of the traveling path of the mobile robot can be facilitated. Since each beacon 2 instructs rotation of the mobile robot, setting of complicated traveling paths can be facilitated. Also, when the mobile robot arrives at the target point in the traveling path, the mobile robot can be stopped, and unnecessary movement of the bile robot can be suppressed.

The mobile robot of the present embodiment can be used, for example, in a conveyance devices that conveys parcels.

Since the mobile robot according to the present embodiment has a high degree of freedom in the arrangement of the beacon 2, it is possible to easily set and change the traveling path of the mobile robot in a warehouse, a factory or the like, and make it possible to use it according to the usage environment.

Also, in the mobile robot of the present embodiment, the configuration in which the beacon 2 and the beacon detection unit 12 transmits and receives infrared signals has been described. However, instead of the beacon 2, a transmitter that transmits a visible light signal, a wireless signal or a sound wave signal other than the infrared light signal may be used. When the transmitter transmits a signal other than the infrared signal, the beacon detection unit 12 includes at least two sensors for detecting the signal transmitted from the transmitter, and detects the distance to the transmitter and the direction of the transmitter. For the plurality of transmitters and the beacon detection unit 12, any means may be used as long as the beacon detection unit 12 can acquire the distance Z and the direction θ to the transmitter with reference to the traveling direction of the mobile robot.

Also, instead of transmitters such as a plurality of beacons 2 that transmit signals, a plurality of markers not transmitting signals may be used. When the markers are used, a marker detection unit is used instead of the beacon detection unit 12. The marker detection unit may operate similarly to the beacon detection unit 12 by detecting a combination of geometric figures or colors provided for each marker. The combination of the geometric figures or colors may include IDs that identify the marker. For example, a QR code (registered trademark) may be used as a geometric figure.

Also, in place of the beacon 2 actively transmitting a signal, a marker using an RFID element that transmits a response signal according to a signal transmitted from a mobile robot or a marker using an element that reflects a signal transmitted from a mobile robot may be disposed. When a marker that performs passive operation is used, a transmitter that transmits a predetermined signal is provided in the mobile robot. In this manner, the detection object such as the beacon 2 or the marker may be a kind that can detect the relative position of the mobile robot.

Also, in the present embodiment, the beacon detection unit 12 has been described based on the operation of detecting the beacon of the beacon ID input from the beacon selection unit. However, the beacon detection unit 12 may calculate the beacon information of all the detected beacons 2, and may output the calculated respective pieces of beacon information to the control unit. In this case, the beacon selection unit selects the beacon information of the target beacon 2 from the plurality of pieces of beacon information based on the instruction output from beacon selection unit 132.

Also, the mobile robot described above may have a computer system therein. In that case, the procedure of the processing performed by the control unit provided in the mobile robot is stored in a computer-readable recording medium in the form of a program, and by reading and executing this program using the computer, the processing of each functional unit is performed. Here, the computer-readable recording medium means a magnetic disk, a magneto-optical disk, a CD-ROM, a DVD-ROM, a semiconductor memory, or the like. Further, the computer program may be delivered to a computer through a communication line, and the computer receiving the distribution may execute the program.

Also, it should be noted that the above embodiment is presented as an example, and it is not intended to limit the scope of the invention. These novel embodiments can be implemented in various other forms and various omissions, substitutions, and changes can be made without departing from the spirit of the invention. These embodiments and modifications thereof are included in the scope and gist of the invention and are included in the invention described in the claims and the equivalent scope thereof.

INDUSTRIAL APPLICABILITY

The present invention can also be applied to applications in which it is indispensable to reduce the traveling distance when moving based on a plurality of beacons.

REFERENCE SIGNS LIST

1, 5 Mobile robot
2 Beacon (detection object)
11 Driving unit
12 Beacon detection unit (detection unit)
13 Control unit
541, 542 Detection sensor

The invention claimed is:

1. A mobile robot, comprising:
a driving unit which changes a moving velocity and a traveling direction;
a detection sensor which detects a distance to an object existing sideward when a traveling direction is defined as forward at a predetermined cycle;
a detection unit which detects a plurality of detection objects disposed along a traveling path to a target point; and
a processor connected to the driving unit, the detection sensor, and the detection unit, the processor executing instructions to
acquire a distance and a direction to a detection object detected by the detection unit,
calculate an angle indicating an inclination of a first travel direction with respect to the traveling path from a variation amount of the distance detected by the detection sensor in the predetermined cycle and a traveled distance in the predetermined cycle, wherein the first travel direction is a current travel direction of the mobile robot,
calculate a second traveling direction from which the first travel direction is changed to keep the mobile robot at a constant distance with respect to a boundary of the traveling path based on the distance to the detection object and the direction of the detection object corrected by the angle, and
control the driving unit to turn the mobile robot to the second direction.

2. The mobile robot according to claim 1,
wherein the processor calculates the traveling direction such that the distance to the object detected by the detection sensor is constant.

3. The mobile robot according to claim 1, wherein the processor accesses a table which preliminarily stores a distance to the traveling path of each of the detection objects,
wherein the processor acquires a distance between a detection object detected by the detection unit and the traveling path, and calculates the traveling direction based on an angle obtained from arcsin(X/Z) when the acquired distance is set to X and the distance to the detected detection object is set to Z.

4. The mobile robot according to claim 3, wherein
the table stores information on which of a right side and a left side of each of the detection objects is disposed with respect to the traveling path to the target point, and
the processor calculates the traveling direction based on a position of the detected detection object with respect to the traveling path.

5. The mobile robot according to claim 3, wherein
the table stores a rotation information indicating presence or absence of a change of the traveling direction at each of the detection objects, and
with the change of the traveling direction with respect to the detected detection object being present in the table, the processor changes the traveling direction when the distance to the detected detection object reaches a predetermined distance.

6. The mobile robot according to claim 3, wherein
the table stores information indicating a detection object closest to the target point, and
with the detected detection object being the detection object closest to the target point, the processor controls the driving unit such that the driving unit stops when the distance to the detected detection object reaches a predetermined distance.

7. A control method of a mobile robot including a driving unit which changes a moving velocity and a traveling direction, a detection unit which detects a plurality of detection objects disposed along a traveling path to a target point, and a detection sensor which detects a distance to an object existing sideward when a traveling direction is defined as forward, the method comprising the steps of:
detecting a distance to the object existing sideward at a predetermined cycle by the detection sensor;
acquiring a distance and a direction to a detection object detected by the detecting unit;
calculating an angle indicating an inclination of a first travel direction with respect to the traveling path from a variation amount of the distance detected by the detection sensor in the predetermined cycle and a traveled distance in the predetermined cycle, wherein the first travel direction is a current travel direction of the mobile robot;
calculating a second traveling direction from which the first travel direction is changed to keep the mobile robot at a constant distance with respect to a boundary of the traveling path based on the distance to the detection object and the direction of the detection object corrected by the angle; and
controlling the driving unit to turn the mobile robot to the second direction.

8. The mobile robot according to claim 2,
wherein the processor accesses a table which preliminarily stores a distance to the traveling path of each of the detection objects,
wherein the processor acquires a distance between a detection object detected by the detection unit and the traveling path, and calculates the traveling direction based on an angle obtained from arcsin(X/Z) when the acquired distance is set to X and the distance to the detected detection object is set to Z.

9. The mobile robot according to claim 4, wherein
the table stores a rotation information indicating presence or absence of a change of the traveling direction at each of the detection objects, and
with the change of the traveling direction with respect to the detected detection object being present in the table, the processor changes the traveling direction when the distance to the detected detection object reaches a predetermined distance.

10. The mobile robot according to claim 4, wherein
the table stores information indicating a detection object closest to the target point, and
with the detected detection object being the detection object closest to the target point, the processor controls the driving unit such that the driving unit stops when the distance to the detected detection object reaches a predetermined distance.

11. The mobile robot according to claim 5, wherein
the table stores information indicating a detection object closest to the target point, and
with the detected detection object being the detection object closest to the target point, the processor controls the driving unit such that the driving unit stops when the distance to the detected detection object reaches a predetermined distance.

* * * * *